United States Patent
Nakatsuka et al.

(10) Patent No.: US 11,008,001 B2
(45) Date of Patent: May 18, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Masayuki Nakatsuka, Wako (JP); Haruhiko Nishiguchi, Wako (JP); Hiroyuki Koibuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 16/102,775

(22) Filed: Aug. 14, 2018

(65) Prior Publication Data

US 2019/0071076 A1 Mar. 7, 2019

(30) Foreign Application Priority Data

Sep. 1, 2017 (JP) .............................. JP2017-168724

(51) Int. Cl.
*B60T 7/12* (2006.01)
*B60W 30/09* (2012.01)
(Continued)

(52) U.S. Cl.
CPC ............ *B60W 30/09* (2013.01); *B60W 30/12* (2013.01); *B60W 30/162* (2013.01);
(Continued)

(58) Field of Classification Search
CPC ............... G08G 1/166; G08G 1/09675; G08G 1/096783; G08G 1/096716; G08G 1/0116;
(Continued)

(56) References Cited

U.S. PATENT DOCUMENTS

2016/0207538 A1* 7/2016 Urano .................. G05D 1/0061
2016/0209840 A1* 7/2016 Kim ..................... G05D 1/0061
(Continued)

FOREIGN PATENT DOCUMENTS

CN 103635947 3/2014
CN 105242251 1/2016
(Continued)

OTHER PUBLICATIONS

Japanese Office Action for Japanese Patent Application No. 2017-168724 dated May 14, 2019.
(Continued)

*Primary Examiner* — Shardul D Patel
(74) *Attorney, Agent, or Firm* — Amin, Turocy & Watson, LLP

(57) ABSTRACT

A vehicle control device (100) includes a deceleration controller (110) that operates according to an operation of an occupant of a vehicle or on the basis of a result of detecting a state of the occupant, and performs at least control of decelerating the vehicle, and a lane change controller (150) that causes the vehicle to change a lane independently of a steering operation of the occupant of the vehicle, and at least a part of the control of the deceleration controller is restricted when an operation condition of the deceleration controller and an operation condition of the lane change controller are satisfied at the same time.

10 Claims, 13 Drawing Sheets

(51) Int. Cl.
*B62D 15/02* (2006.01)
*B60W 30/12* (2020.01)
*B60W 30/16* (2020.01)
*B60W 40/08* (2012.01)
*B62D 6/00* (2006.01)
*G08G 1/16* (2006.01)
*B60R 11/04* (2006.01)

(52) U.S. Cl.
CPC ............ *B60W 40/08* (2013.01); *B62D 6/003* (2013.01); *B62D 15/0255* (2013.01); *G08G 1/167* (2013.01); *B60R 11/04* (2013.01); *B60W 2420/52* (2013.01); *B60W 2540/12* (2013.01); *B60W 2540/18* (2013.01)

(58) Field of Classification Search
CPC ........ G08G 1/052; G08G 1/04; G08G 1/0112; G08G 1/163; G08G 1/0133; G01S 13/931; G01S 17/931; G01S 2013/93276; G01S 2013/93277; G01S 13/867; G01S 13/42; G01S 2013/93274; G01S 2013/93272; G01S 2013/93271; G01S 2013/9316; G01S 13/52; B60W 30/18154; B60W 60/0027; B60W 2420/52; B60W 2050/0077; B60W 2555/60; B60W 2554/4042; B60W 30/0953; B60W 30/0956; B60W 30/09; B60W 2554/80; B60T 7/12

USPC ..................................................... 701/44, 96
See application file for complete search history.

(56) References Cited

U.S. PATENT DOCUMENTS

| | | | |
|---|---|---|---|
| 2016/0264021 A1* | 9/2016 | Gillett | H04M 1/7253 |
| 2017/0225686 A1* | 8/2017 | Takaso | B60W 30/12 |
| 2017/0334446 A1* | 11/2017 | Bosch | G08G 1/167 |
| 2018/0065664 A1* | 3/2018 | Watanabe | B62D 15/025 |
| 2018/0170382 A1* | 6/2018 | Soliman | B60L 15/2045 |
| 2018/0251129 A1* | 9/2018 | Ji | B60W 30/0953 |
| 2018/0326996 A1* | 11/2018 | Fujisawa | B60W 50/085 |
| 2019/0009739 A1* | 1/2019 | Lisseman | B60W 50/082 |
| 2019/0086917 A1* | 3/2019 | Okimoto | G05D 1/0061 |
| 2019/0196487 A1* | 6/2019 | Akiyama | B60W 10/08 |
| 2019/0286143 A1* | 9/2019 | Ross | G05D 1/0061 |

FOREIGN PATENT DOCUMENTS

| | | |
|---|---|---|
| JP | 2009-151522 | 7/2009 |
| JP | 2017-091170 | 5/2017 |
| JP | 2017-114196 | 6/2017 |

OTHER PUBLICATIONS

Chinese Office Action for Chinese Patent Application No. 201810907809.0 dated Feb. 2, 2021.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2017-168724, filed Sep. 1, 2017, the content of which is incorporated herein by reference.

BACKGROUND OF THE INVENTION

Field of the Invention

The present invention relates to a vehicle control device, a vehicle control method, and a storage medium.

Description of Related Art

In the related art, an emergency evacuation system that detects a decrease in a consciousness level of a driver and evacuates a subject vehicle is known (see Patent Document 1). This system includes a driver state detection sensor that detects a state of a driver, a lane marking line recognition means for recognizing a lane marking line partitioning a traveling lane, a consciousness level decrease detection means for detecting that the consciousness level has decreased to be equal to or smaller than a predetermined value on the basis of the state of the driver, a lane change determiner that determines whether or not the subject vehicle is crossing the lane marking line when the decrease in the level of consciousness is detected, a lane change direction determination means for determining whether or not a traveling lane that is a crossing destination is farther away from the subject vehicle lane relative to an evacuation destination when it is determined that the vehicle is crossing the lane marking line, a rear vehicle detection means for determining whether or not another vehicle is detected behind the subject vehicle when the traveling lane that is a crossing destination is farther away from the subject vehicle lane relative to the evacuation destination, and a subject vehicle lane returning means for causing the subject vehicle to return to an original traveling lane before the vehicle crosses the lane marking line when the other vehicle is not detected (for example, Japanese Unexamined Patent Application, First Publication No. 2009-151522).

SUMMARY OF THE INVENTION

However, in the above-described related art, since a progressing direction of the vehicle is automatically determined according to a situation around the vehicle, the vehicle may not be able to progress toward a lane on which the vehicle has to originally progress.

Aspects of the present invention have been made in view of such circumstances, and an object of the present invention is to provide a vehicle control device, a vehicle control method, and a storage medium capable of causing a vehicle to progress toward a lane on which the vehicle has to originally progress.

A vehicle control device, a vehicle control method, and a storage medium according to the present invention adopt the following configuration.

(1) A vehicle control device according to an aspect of the present invention is a vehicle control device including: a deceleration controller that performs at least control of decelerating the vehicle, according to an operation performed by an occupant of a vehicle or on the basis of a result of detecting a state of the occupant; and a lane change controller that causes the vehicle to change lane independently of a steering operation of the occupant of the vehicle, wherein at least a part of the control of the deceleration controller is restricted when operation conditions of the deceleration controller and operation conditions of the lane change controller are satisfied at the same time.

(2) In the aspect (1), the deceleration controller decelerates and stops the vehicle, according to an operation performed by an occupant of a vehicle or on the basis of a result of detecting a state of the occupant.

(3) In the aspect (1), the deceleration controller controls a hazard lamp so that the hazard lamp blinks when the deceleration controller decelerates the vehicle, and when the operation conditions of the deceleration controller and the operation conditions of the lane change controller are satisfied at the same time, at least blinking control of the hazard lamp of the deceleration controller is restricted.

(4) In the aspect (1), control of the deceleration controller is performed after the vehicle completes lane change according to the lane change controller when the operation condition of the deceleration controller is satisfied earlier than the operation condition of the lane change controller.

(5) In the aspect (1), when the operation condition of the lane change controller is satisfied earlier than the operation condition of the deceleration controller, the lane change controller determines whether the lane change will continue or the vehicle will return to a lane that is a lane change source on the basis of a position of the vehicle with respect to a lane marking line at a point in time at which the operation condition of the deceleration controller has been satisfied.

(6) In the aspect (1), when the operation condition of the deceleration controller is satisfied and an operation with respect to a detection unit that detects a lane change intention of an occupant of the vehicle continues for a predetermined time or more, the lane change controller does not cause the vehicle to change the lane.

(7) A vehicle control device according to another aspect of the present invention is a vehicle control device, including: a deceleration controller that performs at least control of decelerating the vehicle, according to an operation performed by an occupant of the vehicle or on the basis of a result of detecting a state of the occupant, and; and a lane change controller that causes the vehicle to change lane independently of a steering operation of the occupant of the vehicle, wherein when an operation condition of the lane change controller is satisfied earlier than an operation condition of the deceleration controller, the lane change controller determines whether lane change is to continue or return to a lane that is a lane change source is to be performed on the basis of a position with respect to a lane marking line of the vehicle at a point in time at which the operation condition of the deceleration controller is satisfied.

(8) A vehicle control method according to still another aspect of the present invention is a vehicle control method using a computer mounted on a vehicle, the vehicle control method including: performing deceleration control of decelerating the vehicle, according to an operation performed by an occupant of the vehicle or on the basis of a result of detecting a state of the occupant; and performing lane change control of causing the vehicle to change a lane independently of a steering operation of the occupant of the vehicle, wherein at least a part of the deceleration control is restricted when an operation condition of the deceleration control and an operation condition of the lane change control are satisfied at the same time.

(9) A storage medium according to still another aspect of the present invention is a computer readable non-transitory storage medium having a program stored therein, the program causing a computer to: perform deceleration control of decelerating the vehicle, according to an operation performed by an occupant of a vehicle or on the basis of a result of detecting a state of the occupant; and perform lane change control of causing the vehicle to change a lane independently of a steering operation of the occupant of the vehicle, wherein at least a part of the deceleration control is restricted when an operation condition of the deceleration control and an operation condition of the lane change control are satisfied at the same time.

(10) A vehicle control method according to still another aspect of the present invention is a vehicle control method that is executed by a computer mounted on a vehicle, the vehicle control method comprising: performing deceleration control of decelerating the vehicle, according to an operation performed by occupant of the vehicle or on the basis of a result of detecting a state of the occupant; performing lane change control of causing the vehicle to change a lane independently of a steering operation of the occupant of the vehicle; and determining whether the lane change continues or return to a lane that is a lane change source is performed on the basis of a position with respect to a lane marking line of the vehicle at a point in time at which an operation condition of the deceleration control is satisfied when an operation condition of the lane change control is satisfied earlier than the operation condition of the deceleration control.

(11) A storage medium according to still another aspect of the present invention is a computer readable non-transitory storage medium having a program stored therein, the program causing a computer to: perform deceleration control of decelerating the vehicle, according to an operation performed by an occupant of the vehicle or on the basis of a result of detecting a state of the occupant; perform lane change control of causing the vehicle to change a lane independently of a steering operation of the occupant of the vehicle; and determine whether the lane change continues or return to a lane that is a lane change source is performed on the basis of a position with respect to a lane marking line of the vehicle at a point in time at which an operation condition of the deceleration control is satisfied when an operation condition of the lane change control is satisfied earlier than the operation condition of the deceleration control.

According to (1) to (11), it is possible to cause the vehicle to progress toward a lane on which the vehicle has to originally progress in a scene in which the deceleration control and the lane change control interfere with each other.

According to (3), it is possible to avoid occurrence of a situation in which occupants of another vehicle traveling near the subject vehicle are confused due to a behavior of the subject vehicle and blinking of the hazard lamp being not linked to each other.

According to (5) and (7), it is possible to reduce a movement in a lateral direction of the vehicle until the vehicle returns to the lane that is a lane change source or completes lane change and reduce an influence on all traffic.

According to (6), it is possible to prevent unnecessary lane change from being performed when the occupant of the vehicle operates the deceleration control and then falls down to an indicator for instructing lane change control.

DETAILED DESCRIPTION OF THE INVENTION

Hereinafter, embodiments of a vehicle control device, a vehicle control method, and a storage medium according to the present invention will be described with reference to the drawings.

Figure 1:
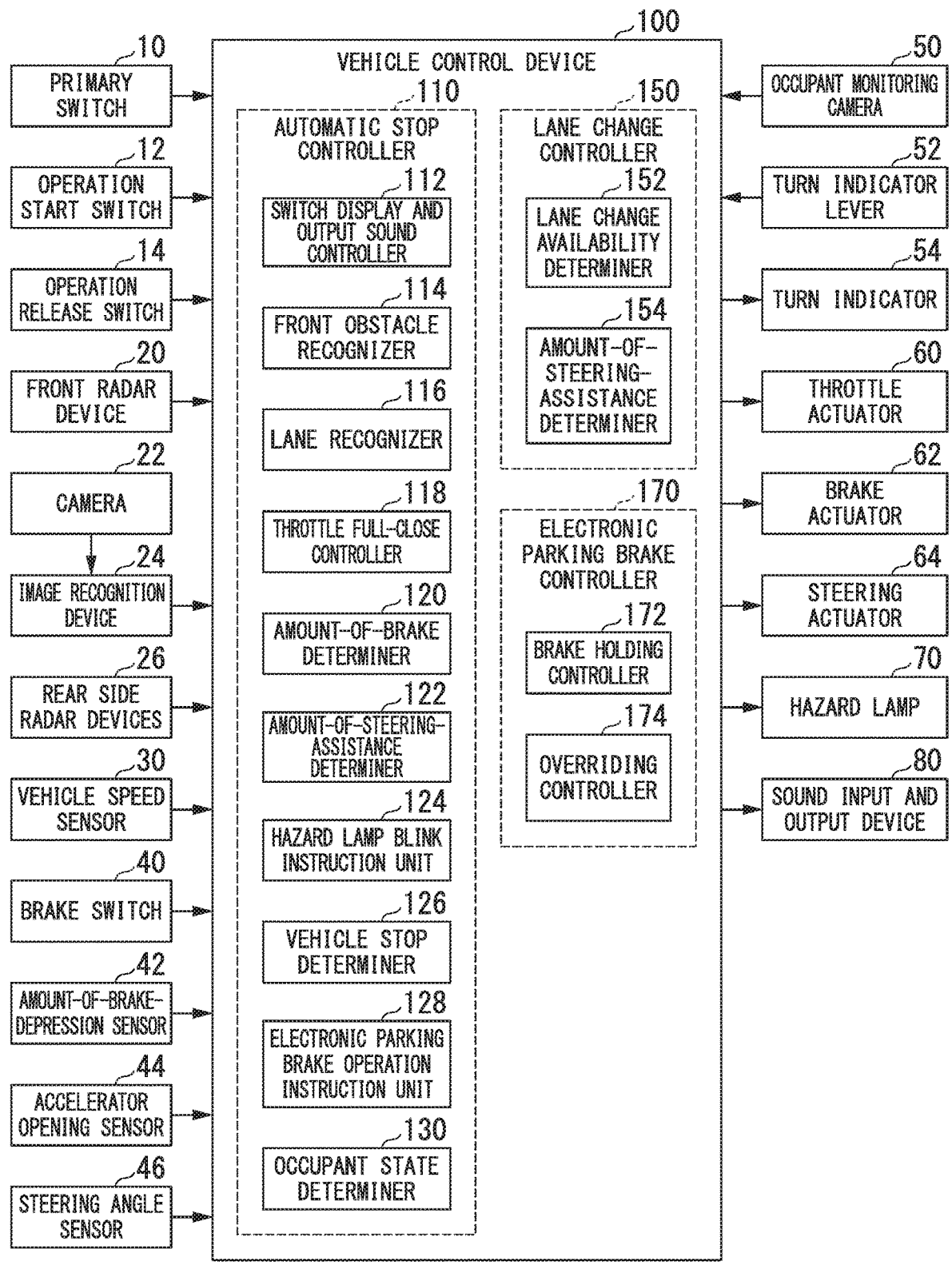
FIG. 1 is a diagram illustrating an example of a configuration of a vehicle (hereinafter referred to as a subject vehicle) in which a vehicle control device according to an embodiment is mounted.

FIG. 1 is a diagram illustrating an example of a configuration of a vehicle control device 100 according to an embodiment. A primary switch 10, an operation start switch 12, an operation release switch 14, a front radar device 20, a camera 22, an image recognition device 24, a vehicle speed sensor 30, a brake switch 40, an amount-of-brake-depression sensor 42, an accelerator opening sensor 44, a steering angle sensor 46, and an occupant monitoring camera 50 are connected to the vehicle control device 100. A throttle actuator 60, a brake actuator 62, a steering actuator 64, a hazard lamp 70, and a sound input and output device 80 which are control target devices are connected to the vehicle control device 100.

The vehicle control device 100 includes, for example, an automatic stop controller 110, a lane change controller 150, and an electronic parking brake controller 170. The automatic stop controller 110 includes, for example, a switch display and output sound controller 112, a front obstacle recognizer 114, a lane recognizer 116, a throttle full-close controller 118, an amount-of-braking determiner 120, an amount-of-steering-assistance determiner 122, a hazard lamp blink instruction unit 124, a vehicle stop determiner 126, an electronic parking brake operation instruction unit 128, and an occupant state determiner 130. The lane change controller 150 includes, for example, a lane change availability determiner 152 and an amount-of-steering-assistance determiner 154. The electronic parking brake controller 170 includes a brake holding controller 172 and an overriding controller 174. These components are realized, for example, by a hardware processor such as a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), or may be realized by cooperation between software and hardware. The automatic stop controller 110, the lane change controller 150, and the electronic parking brake controller 170 may be realized by one processor or may be realized by distributed processors. In the latter case, the vehicle control device 100 may be a system in which a plurality of electronic controllers (ECUs) are combined.

Figure 2:
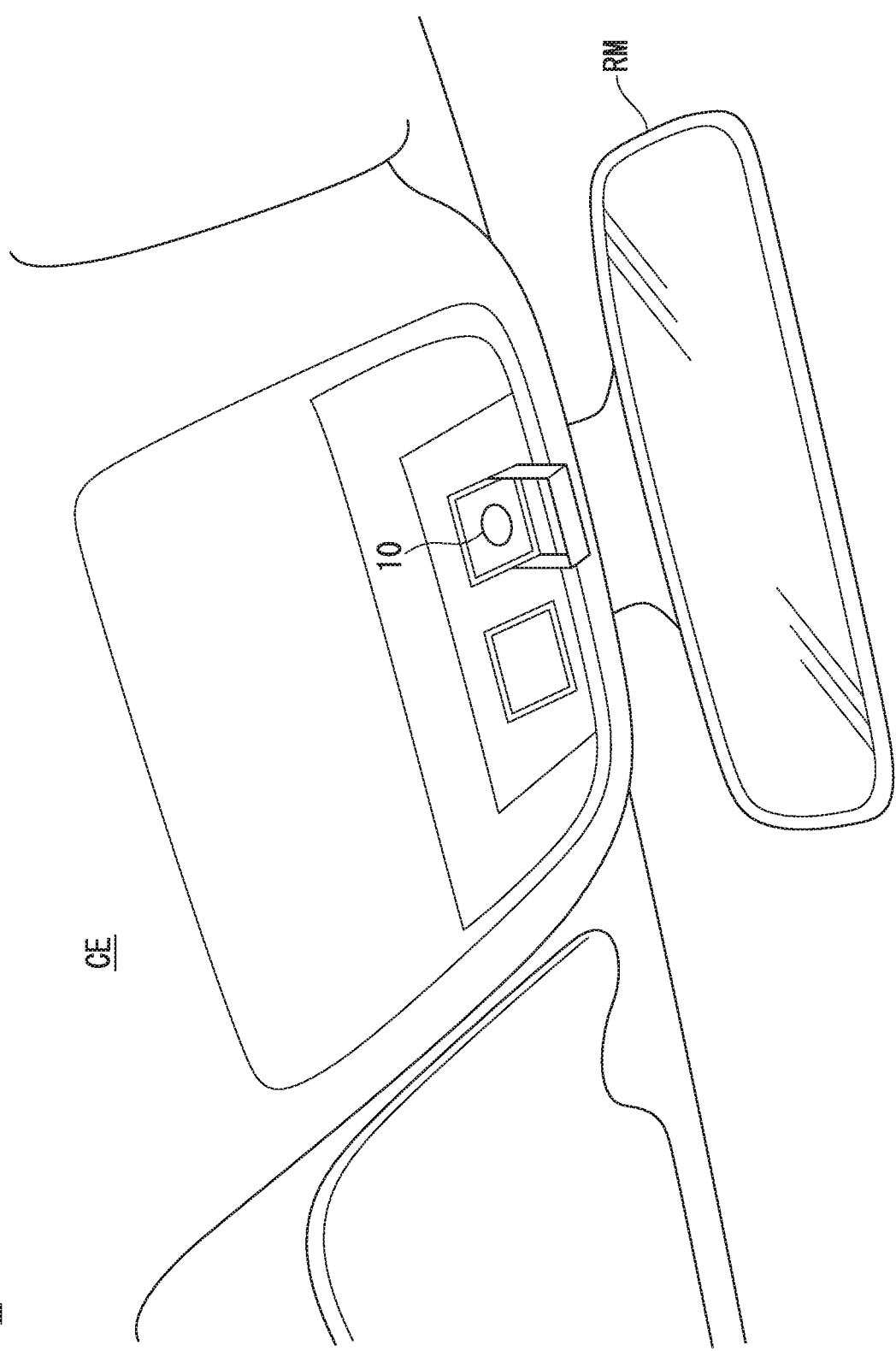
FIG. 2 is a diagram illustrating an example of an installation position of a primary switch.

The primary switch 10 is a switch for setting the operation start switch 12 to be in an operable state. FIG. 2 is a diagram illustrating an example of an installation position of the primary switch 10. As illustrated in FIG. 2, for example, the primary switch 10 is installed on the side in front of an in-vehicle ceiling CE (near a rearview mirror RM). The operation start switch 12 is a switch for instructing start of an operation of automatic stop control. The operation release switch 14 is a switch for instructing release of the operation of the automatic stop control. These aspects will be described below.

The front radar device 20 radiates radio waves such as millimeter waves in front of the subject vehicle and detects at least a position of (a distance and a direction to) an object by detecting radio waves (reflected waves) reflected by an object. One or a plurality of front radar devices 20 are attached to arbitrary places on the subject vehicle. The front radar device 20 may detect a position and a speed of the object using a frequency modulated continuous wave (FM-CW) scheme. The front radar device 20 outputs a detection result to the vehicle control device 100.

The camera 22 is, for example, a digital camera using a solid-state imaging element such as a charge coupled device (CCD) or a complementary metal oxide semiconductor (CMOS). One or more cameras 22 are attached to arbitrary places on the subject vehicle. In a case in which a scene in front is imaged, the camera 22 is attached to an upper portion of a front windshield, a rear surface of a rearview mirror, or the like. The camera 22, for example, periodically repeatedly images the surroundings of the subject vehicle. The camera 22 may be a stereo camera.

The image recognition device 24 recognizes a position, a type, a speed, or the like of an object present near the subject vehicle on the basis of the image captured by the camera 22. The image recognition device 24 outputs a recognition result to the vehicle control device 100.

A rear side radar device 26 radiates radio waves such as millimeter waves to the side to the rear of the vehicle and detects radio waves (reflected waves) reflected by an object to detect at least a position of (a distance and a direction to) the object. One or more of the rear side radar devices 26 are attached to arbitrary positions on the subject vehicle. The rear side radar device 26 may detect a position and a speed of the object using an FM-CW scheme. The rear side radar device 26 outputs a detection result to the vehicle control device 100.

The vehicle speed sensor 30 detects a speed of the subject vehicle. The vehicle speed sensor 30 outputs a detection result to the vehicle control device 100.

The brake switch 40 is attached to a brake pedal and detects the presence or absence of depression of the brake pedal. The brake switch 40 outputs a detection result to the vehicle control device 100. The amount-of-brake-depression sensor 42 is attached to the brake pedal and detects the amount of depression (or depression pressure) of the brake pedal. The amount-of-brake-depression sensor 42 outputs a detection result to the vehicle control device 100. The accelerator opening sensor 44 is attached to an accelerator pedal and detects the amount of operation of the accelerator pedal. The accelerator opening sensor 44 outputs a detection result to the vehicle control device 100. Hereinafter, the operation of the accelerator pedal by an occupant of the subject vehicle may be referred to as an accelerator operation. The steering angle sensor 46 detects an operating angle of the steering wheel. The steering angle sensor 46 outputs a detection result to the vehicle control device 100.

The occupant monitoring camera 50 is a digital camera using a solid-state imaging element such as a CCD or a CMOS. The occupant monitoring camera 50 performs imaging around a face of an occupant seated in a driver's seat.

A turn indicator lever 52 is a switch for instructing an operation of the turn indicator. The turn indicator lever 52 is also used as a switch for instructing execution of the lane change control of the lane change controller 150. A detector other than the turn indicator lever 52 may be used as a switch for instructing execution of the lane change control of the lane change controller 150.

The turn indicator 54 is disposed at a position from a front end portion to a rear end portion on the side of the subject vehicle. Turn indicators 54 are disposed on each of the left and right sides of the subject vehicle, and the turn indicator 54 on the side on which the turn indicator lever 52 is operated performs a blinking operation.

The throttle actuator 60 is attached to a throttle valve that adjusts the amount of air supply to an engine, and adjusts a driving force of the subject vehicle by adjusting a degree of opening of the throttle valve (a degree of throttle opening).

The brake actuator 62 controls the amount of braking (a brake torque or a braking force) acting on the subject vehicle. The brake actuator 62 may separately include a mechanism for driving a brake shoe with a booster, and a mechanism for directly driving the brake shoe, which is used for electronic parking brake control.

The steering actuator 64 is attached to a steering mechanism of the subject vehicle and outputs a steering force to vehicle wheels.

The hazard lamp 70 is generally attached to a rear portion of the subject vehicle and performs a blinking operation in an ON state. The sound input and output device 80 includes a microphone and a speaker.

[Automatic Stop Control]

Hereinafter, the automatic stop controller 110 will be described. The automatic stop controller 110 performs control for gradually decelerating the speed of the subject vehicle and automatically stopping the subject vehicle on a shoulder of a road or the like (hereinafter referred to as automatic stop control) according to an operation of the occupant of the subject vehicle or a state of the occupant seated in the driver's seat. When the occupant of the subject vehicle determines that it is difficult to continue driving due to, for example, a deteriorating physical condition, the occupant of the subject vehicle operates the primary switch 10 and the operation start switch 12 to start automatic stop control. The automatic stop control may be automatically started when a state of the occupant seated in the driver's seat is a state in which it is difficult for the occupant to continue driving. In the following description, it is assumed that the primary switch 10 and the operation start switch 12 being operated or the state of the occupant seated in the driver's seat being determined to be a state in which it is difficult for the occupant to continue driving is the operation condition of the automatic stop control being satisfied. With the automatic stop control, an emergency center or the like may be called or information may be transmitted by e-mail or the like. The automatic stop controller 110 includes a function of decelerating the subject vehicle and is an example of a "deceleration controller". The automatic stop control is an example of "deceleration control". The vehicle control device 100 may include a "deceleration controller that decelerates (does not stop) the subject vehicle according to an operation of an occupant of the subject vehicle or a state of an occupant seated in the driver's seat", in place of the automatic stop controller 110.

When the primary switch 10 is operated, the switch display and output sound controller 112 of the automatic stop controller 110 first causes the operation start switch 12 and the operation release switch 14 to be displayed in a non-operable state (a state in which an operation with respect to the switch is invalid) on the touch panel 11.

Figure 3:
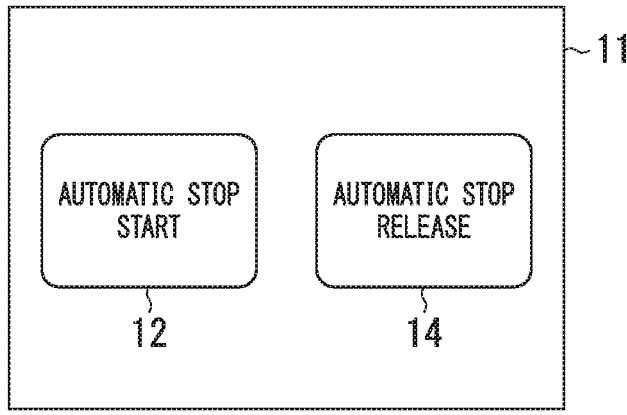
FIG. 3 is a diagram illustrating an example of a screen to be displayed on a touch panel after a primary switch is operated.

FIG. 3 is a diagram illustrating an example of a screen that is displayed on the touch panel 11 after the primary switch 10 is operated. For example, the switch display and output sound controller 112 causes the touch panel 11 to display the operation start switch 12 and the operation release switch 14 in a grayed-out manner to notify the occupant that the switches are in a non-operable state (an operation with respect to the switch is invalid). The switch display and output sound controller 112 continues to display such a screen on the touch panel 11 until a predetermined time (for example, about 3 seconds) elapses from the primary switch 10 being operated.

When a predetermined time has elapsed after the primary switch 10 is operated, the switch display and output sound controller 112 causes the touch panel 11 to display the operation start switch 12 in an operable state and the operation release switch 14 in a non-operable state.

Figure 4:
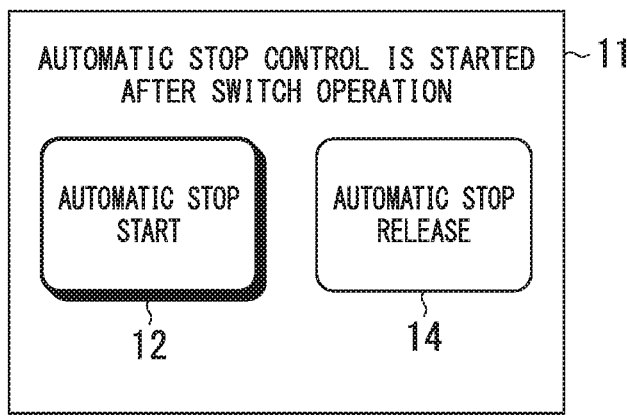
FIG. 4 is a diagram illustrating an example of a screen to be displayed on the touch panel after a predetermined time has elapsed.

FIG. 4 is a diagram illustrating an example of a screen that is displayed on the touch panel 11 after a predetermined time has elapsed. For example, the switch display and output sound controller 112 displays the operation start switch 12 on the touch panel 11 in a highlighted manner and displays the operation release switch 14 in a grayed-out manner to notify the occupant that the operation start switch 12 can be newly operated (an operation with respect to the switch is valid). In this case, the switch display and output sound controller 112 may notify the occupant that the automatic stop control is started when the operation start switch 12 displayed in a highlighted manner has been operated (touched), using text or sound.

When the operation start switch 12 displayed in the operable state is operated by the occupant, the switch display and output sound controller 112 causes the touch panel 11 to display the operation start switch 12 in the non-operable state and the operation release switch 14 in an operable state.

Figure 5:
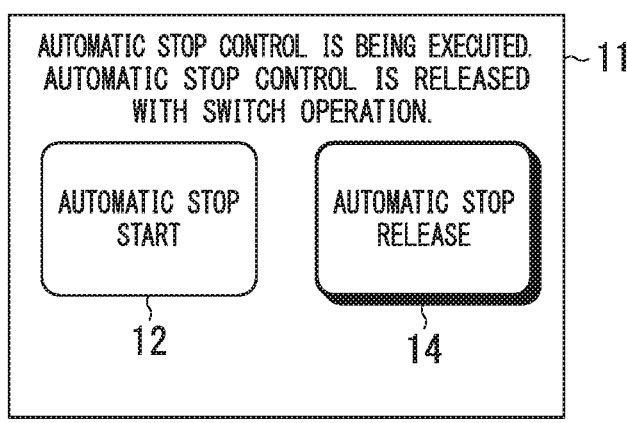
FIG. 5 is a diagram illustrating an example of a screen to be displayed on the touch panel after an operation start switch is operated.

FIG. 5 is a diagram illustrating an example of a screen that is displayed on the touch panel 11 after the operation start switch 12 is operated. For example, the switch display and output sound controller 112 displays the operation start switch 12 on the touch panel 11 in a grayed-out manner and displays the operation release switch 14 in a highlighted manner to notify the occupant that the operation release switch 14 can be newly operated. In this case, the switch display and output sound controller 112 may notify the occupant that the automatic stop control is released (ended) when the operation release switch 14 displayed in a highlighted manner has been operated (touched), using text or sound.

In the above-described example, the operation start switch 12 and the operation release switch 14 are assumed to be virtual switches displayed on the touch panel 11, but the present invention is not limited thereto. For example, the operation start switch 12 and the operation release switch 14 may be provided as mechanical switches.

Figure 6:
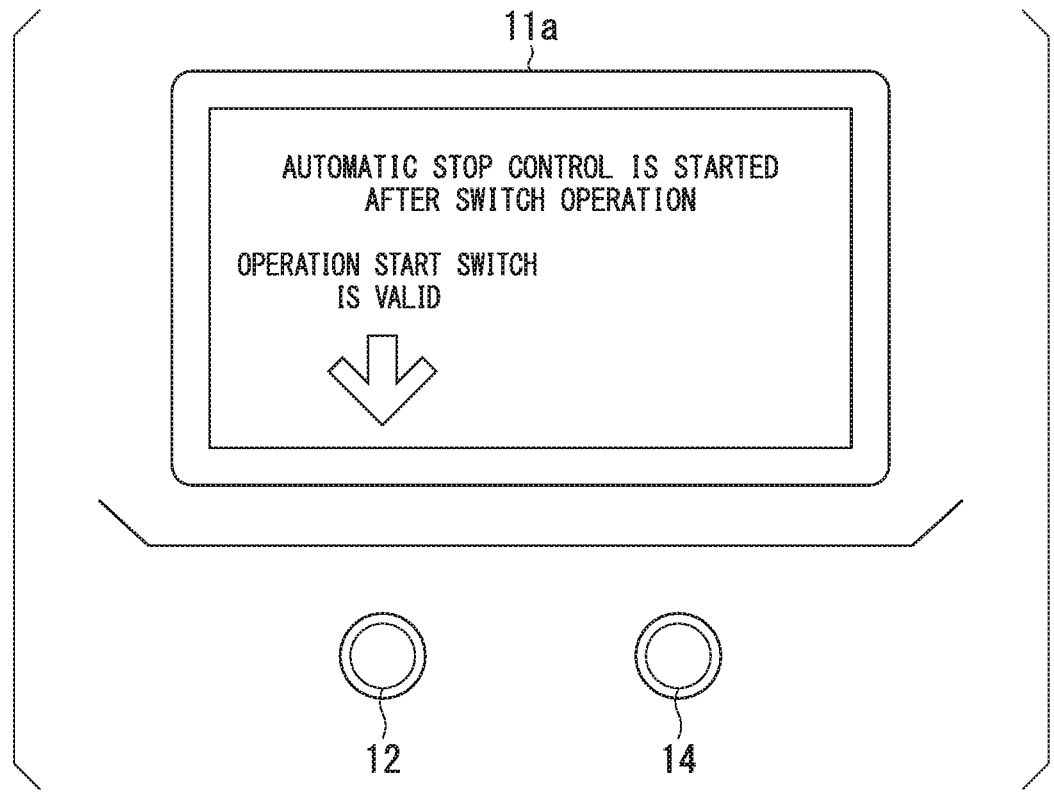
FIG. 6 is a diagram illustrating an example of a screen to be displayed on a display device when the operation start switch and an operation release switch are mechanical switches.

FIG. 6 is a diagram illustrating an example of a screen displayed on the display device 11a when the operation start switch 12 and the operation release switch 14 are mechanical switches. As shown in the illustrated example, the operation start switch 12 and the operation release switch 14 are provided, for example, under the display device 11a. For example, when a predetermined time has elapsed after the primary switch 10 has been operated, the switch display and output sound controller 112 shifts the operation start switch 12 from a non-operable state to an operable state and maintains the operation release switch 14 in the non-operable state. The switch display and output sound controller 112 causes the display device 11a to display text or symbols indicating that the operation start switch 12 is in the operable state. In the illustrated example, the switch display and output sound controller 112 causes text "the operation start switch is valid" and an arrow indicating that the switch is located downward to be displayed in an area of the screen located above the operation start switch 12.

Figure 7:
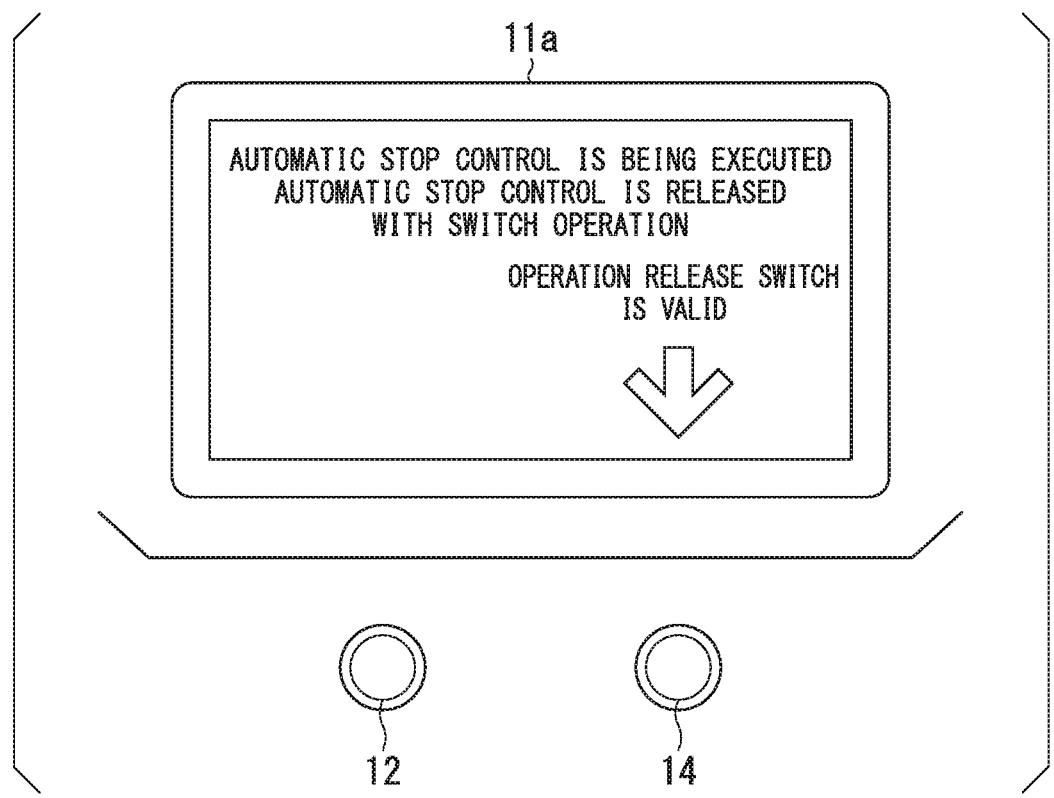
FIG. 7 is a diagram illustrating another example of a screen to be displayed on a display device when the operation start switch and the operation release switch are mechanical switches.

FIG. 7 is a diagram illustrating another example of a screen displayed on the display device 11a when the operation start switch 12 and the operation release switch 14 are mechanical switches. For example, when the operation start switch 12 shifted to an operable state is operated by the occupant, the switch display and output sound controller 112 shifts the operation start switch 12 from the operable state to the non-operable state and shifts the operation release switch 14 from the non-operable state to the operable state. The switch display and output sound controller 112 causes the display device 11a to display text or symbols indicating that the operation release switch 14 is in a state in which the operation release switch 14 can be operated. In the illustrated example, the switch display and output sound controller 112 causes text "the activation release switch is valid" and an arrow for indicating that the switch is located downward to be displayed in an area of the screen located above the operation release switch 14.

A configuration in which the primary switch 10 and the operation start switch 12 are included separately in this way is merely an example, and the vehicle control device 100 may receive an instruction to start the automatic stop control from one switch.

In order to determine a target position at which the subject vehicle is caused to be automatically stopped, the front obstacle recognizer 114 recognizes a position and a speed of a vehicle, and a pedestrian, a bicycle, and other obstacles present in front of the subject vehicle by referring to the detection result of the front radar device 20 and the recognition result of the image recognition device 24.

The lane recognizer 116 recognizes a position of a road marking line present around the subject vehicle and a position on a lane by referring to the recognition result of the image recognition device 24. The lane recognizer 116 recognizes a relative position of the subject vehicle with respect to the lane.

The throttle full-close controller 118 is activated after the automatic stop control is started, and controls the throttle actuator 60 to cause the throttle opening to be in a fully closed state.

In the automatic stop control, the amount-of-braking determiner 120 determines the amount of braking for stopping the vehicle (amount of automatic stop braking) and outputs the amount of braking to the brake actuator 62. The amount-of-braking determiner 120, for example, determines the amount of automatic stop braking such that the subject vehicle decelerates to a stopped state at a constant deceleration on the basis of the position of the obstacle in front of or behind the subject vehicle and the speed of the subject vehicle. There is no particular limitation on a specific scheme for determining the amount of automatic stop braking, and any scheme such as performance of speed feedback may be used. When the amount of braking based on the detection result of the amount-of-brake-depression sensor 42 exceeds the amount of automatic stop braking determined by the amount-of-braking determiner 120, the amount-of-braking determiner 120 may output the latter amount of braking to the brake actuator 62.

In the automatic stop control, the amount-of-steering-assistance determiner 122 determines the amount of steering assistance for guiding the subject vehicle to the target position and outputs the amount of steering assistance to the steering actuator 64.

The hazard lamp blink instruction unit 124 is activated after the automatic stop control is started, and causes the hazard lamp 70 to be continuously in an ON state (instructs the hazard lamp 70 to blink).

In a process of the automatic stop control, the vehicle stop determiner 126 determines whether or not the subject vehicle has stopped. Specifically, the vehicle stop determiner 126 determines whether or not the speed of the subject vehicle output by the vehicle speed sensor 30 is smaller than a stop determination threshold value Vstp, and determines that the subject vehicle has stopped when the speed of the subject vehicle is smaller than the stop determination threshold value Vstp.

When the vehicle stop determiner 126 determines that the subject vehicle has stopped, the electronic parking brake operation instruction unit 128 instructs the electronic parking brake controller 170 to operate.

The occupant state determiner 130 analyzes a captured image of the occupant monitoring camera 50 and determines whether or not an occupant seated in the driver's seat is in a state in which it is difficult for the occupant to continue driving. For example, the occupant state determiner 130 may determine whether or not the occupant is in a state in which it is difficult for the occupant to continue driving on the basis of, for example, motion of the eyes or a state of the eyelids of the occupant.

[Lane Change Control]

Hereinafter, the lane change controller 150 will be described. When a <<start condition>> is satisfied, the lane change controller 150 performs lane change control for causing the subject vehicle to change the lane independently of a steering operation of the occupant. Start conditions of the lane change control are, for example, (A) predetermined driving assistance being performed, and (B) the turn indicator lever 52 having been operated for a first predetermined time T1 or more. Using these as starting conditions, the lane change controller 150 performs lane change in a direction in which the turn indicator lever 52 is operated. The first predetermined time T1 is a threshold value for preventing the lane change control from being operated when the occupant of the vehicle touches the turn indicator lever 52 by mistake.

When the start conditions are satisfied, the lane change availability determiner 152 determines whether or not lane change in the direction in which the turn indicator lever 52 is operated is available. For this determination, the lane change availability determiner 152 ascertains an object near the subject vehicle and a relative position of the lane marking line with respect to the subject vehicle on the basis of the detection result of the front radar device 20, the recognition result of the image recognition device 24, and the detection result of the rear side radar device 26.

For example, the lane change availability determiner 152 determines that lane change is available when all of the following <<execution conditions>> are satisfied and determines that the lane change is unavailable when any one of the conditions is not satisfied. The "operation condition" is a combination of the start condition and the execution condition.

Condition (1): No obstacle is present in a lane that is a lane change destination.

Condition (2): A lane marking line LM partitioning between the lane that is a lane change destination and the subject vehicle lane is not a road sign indicating lane change prohibition (protrusion prohibition).

Condition (3): The lane that is a lane change destination has been recognized (actually present).

Condition (4): A yaw rate detected by a yaw rate sensor (not illustrated) is smaller than a threshold value.

Condition (5): A radius of a curvature of a road on which the subject vehicle is traveling is equal to or greater than a predetermined value.

Condition (6): A speed of the subject vehicle is within a predetermined speed range.

[Method of Determining Condition (1)]

In order to determine whether or not condition (1) is satisfied, the lane change availability determiner 152, for example, sets a target position that is a lane change destination in an adjacent lane (hereinafter referred to as a lane change target position TAs) and determines whether or not a nearby vehicle is present as an obstacle at the lane change target position TAs.

Figure 8:
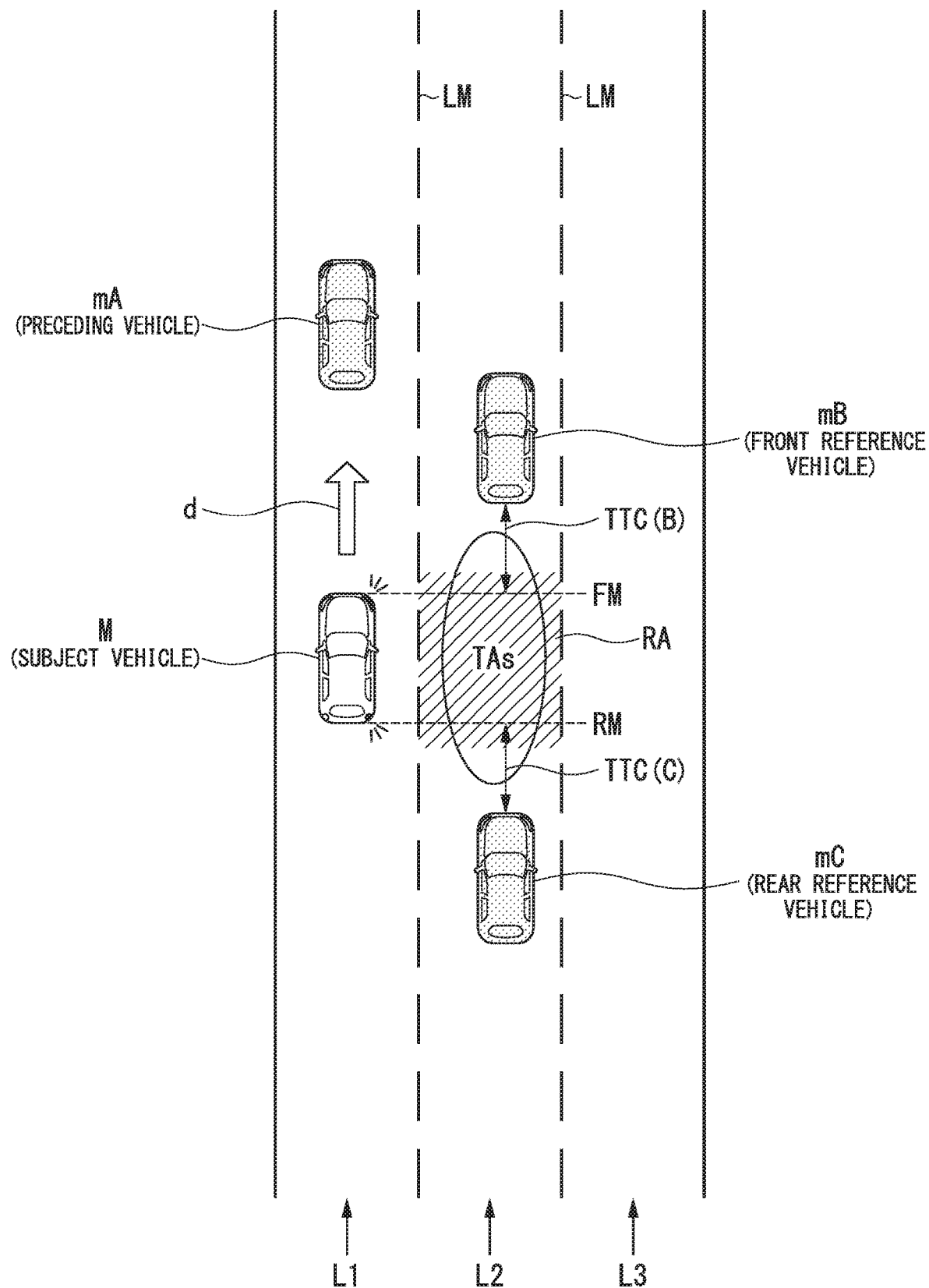
FIG. 8 is a diagram schematically illustrating a state in which a lane change target position is set in an adjacent lane.

FIG. 8 is a diagram schematically illustrating a state in which the lane change target position TAs is set in the adjacent lane. In FIG. 8, the subject vehicle is denoted as M. In FIG. 8, L1 denotes a subject lane (a first lane), L2 denotes an adjacent lane (a second lane) that is a lane change destination of the subject vehicle, and L3 denotes a lane (a third lane) adjacent to the adjacent lane L2. Here, the third lane is a lane adjacent on the side opposite to the first lane when viewed from the second lane. An arrow d denotes a progressing (traveling) direction of the subject vehicle.

For example, when a lane change to the adjacent lane L2 is instructed by an operation of the turn indicator lever 52, the lane change availability determiner 152 selects any two vehicles (for example, two vehicles relatively close to the subject vehicle) from among vehicles present in the adjacent lane L2, and sets a lane change target position TAs between the two selected adjacent vehicles. For example, the lane change target position TAs may be set at a center of the adjacent lane L2. In the following description, a nearby vehicle present immediately before the set lane change target position TAs will be referred to as a "front reference vehicle mB", and a nearby vehicle present immediately behind the lane change target position TAs will be referred to as a "rear reference vehicle mC". The lane change target position TAs is a relative position based on a positional relationship between the subject vehicle and the front reference vehicle mB and the rear reference vehicle mC.

After the lane change availability determiner 152 sets the lane change target position TAs, the lane change availability determiner 152 sets a prohibition area RA as illustrated in FIG. 8 on the basis of a setting position of the lane change target position TAs. For example, the lane change availability determiner 152 projects the subject vehicle to the adjacent lane L2 that is a lane change destination, and sets an area having some margin distances in front of and behind the projected vehicle as the prohibition area RA. The prohibition area RA is set as an area extending from one lane marking line LM partitioning the adjacent lane L2 to the other lane marking line LM.

When there are no parts of the nearby vehicles in the set prohibition area RA, a time-to-collision (TTC)(B) between the subject vehicle and the front reference vehicle mB is greater than a threshold value Th(B), and a time-to-collision TTC(C) between the subject vehicle and the rear reference vehicle mC is greater than a threshold value Th(C), the lane change availability determiner determines that the condition (1) is satisfied. "There is no part of the nearby vehicle in the prohibition area RA" means, for example, that the prohibition area RA and an area indicating the nearby vehicle do not overlap each other when viewed from above. The time-to-collision TTC(B) is calculated, for example, by dividing a distance between an extension line FM virtually extending from a front end of the subject vehicle toward the adjacent lane L2 and the front reference vehicle mB by a relative speed between the subject vehicle and the front reference vehicle mB. The time-to-collision TTC(C) is calculated, for example, by dividing a distance between an extension line RM virtually extending from a rear end of the subject vehicle toward the adjacent lane L2 and the rear reference vehicle mC by a relative speed between the subject vehicle and the rear reference vehicle mC. The threshold values Th(B) and Th(C) may be the same value or may be different values.

When the condition (1) is not satisfied, the lane change availability determiner 152 may repeatedly determine whether or not the condition (1) is satisfied and determine that the lane change is unavailable, by selecting two other vehicles from among the nearby vehicles present in the adjacent lane L2 and newly setting the lane change target position TAs. In this case, the vehicle control device 100 may control the speed of the subject vehicle so that the current speed is maintained until the lane change target position TAs satisfying the condition (1) is set or may accelerate or decelerate the subject vehicle so that the subject vehicle moves to the side of the lane change target position TAs.

When there are no nearby vehicles in the adjacent lane L2 at the time of setting the lane change target position TAs, the lane change availability determiner 152 may determine that the condition (1) is satisfied since there are no nearby vehicles interfering with the prohibition area RA. When there is only one nearby vehicle in the adjacent lane L2 at the time of setting the lane change target position TAs, the lane change availability determiner 152 may set the lane change target position TAs at an arbitrary position in front of or behind the nearby vehicle.

[Method of Determining Condition (2)]

For example, the lane change availability determiner 152 determines whether or not the condition (2) is satisfied according to a type of the lane marking line between the subject lane and the adjacent lane that is a lane change destination, that is, a lane marking line that the vehicle needs to straddle at the time of the lane change. For example, the lane change availability determiner 152 determines that the condition (2) is not satisfied when the lane marking line between the subject lane and the adjacent lane that is a lane change destination is a road sign (for example, a yellow solid line) indicating lane change prohibition or protrusion prohibition, and determines that the condition (2) is satisfied when the lane marking line is a road sign (for example, a white dashed line) indicating others.

[Method of Determining Condition (3)]

For example, the lane change availability determiner 152 determines that the condition (3) is not satisfied when the lane that is the lane change destination is not recognized and determines that the condition (3) is satisfied when the lane that is the lane change destination is recognized. Accordingly, for example, even when an erroneous operation of the occupant instructs the lane change to the side where there is no adjacent lane, the lane change is stopped.

[Method of Determining Condition (4)]

For example, the lane change availability determiner 152 determines whether or not the condition (4) is satisfied according to whether or not a yaw rate detected by a yaw rate sensor (not illustrated) is smaller than a threshold value. This threshold value is set to, for example, a yaw rate at which an overload (an acceleration in a vehicle width direction becomes equal to or greater than a threshold value) is not caused with respect to the occupant when the lane change has been performed. The lane change availability determiner 152 determines that the condition (4) is not satisfied when the yaw rate is equal to or greater than the threshold value and determines that the condition (4) is satisfied when the yaw rate is smaller than the threshold value.

[Method of Determining Condition (5)]

For example, the lane change availability determiner 152 determines whether or not the condition (5) is satisfied according to whether a radius of a curvature of a road on which the subject vehicle is traveling is equal to or greater than a predetermined value. This predetermined value is set to, for example, a radius of a curvature (for example, about 500 [m]) at which an overload is not caused with respect to the occupant when the subject vehicle is caused to travel along the road. The predetermined value may be set to a smaller value (for example, about 200 [m]) as the speed of the subject vehicle decreases and to a larger value (for example, about 1000 [m]) as the speed of the subject vehicle increases. The radius of the curvature may be acquired on the basis of map information (not illustrated) and the position of the subject vehicle or may be derived from the recognition result of the image recognition device 24.

[Method of Determining Condition (6)]

For example, the lane change availability determiner 152 determines whether or not the condition (6) is satisfied according to whether or not the speed of the subject vehicle is within a predetermined speed range. The predetermined speed range is set to, for example, a speed range of about 70 to 110 [km/h]. The lane change availability determiner 152 determines that the condition (6) is not satisfied unless the speed of the subject vehicle is within the predetermined speed range and determines that the condition (6) is satisfied when the speed of the subject vehicle is within the predetermined speed range.

The lane change availability determiner 152 may continue to sequentially determine whether or not the lane change is available irrespective of whether or not the turn indicator lever 52 is operated. In this case, when both of the left and right adjacent lanes are recognized (that is, when there are two lanes to which there is a likelihood of the lane change), the lane change availability determiner 152 may determine whether or not the above condition is satisfied for each lane.

Figure 9:
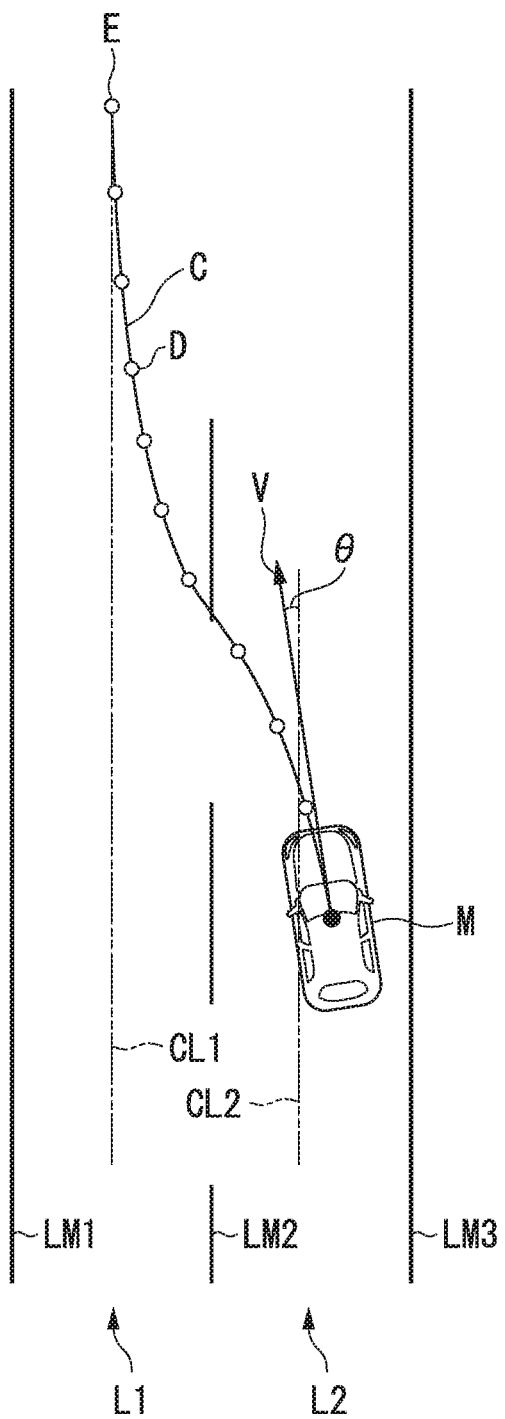
FIG. 9 is a diagram illustrating a process of determining the amount of steering assistance.

The amount-of-steering-assistance determiner 154 determines the amount of steering assistance for causing the subject vehicle to change the lane when the lane change availability determiner 152 determines that the execution condition of the lane change has been satisfied. FIG. 9 is a diagram illustrating a process of determining the amount of steering assistance. FIG. 9 illustrates a state in which the lane is changed from a subject lane L2 to an adjacent lane L1.

The amount-of-steering-assistance determiner 154 multiplies the speed of the subject vehicle by seconds necessary for lane change and derives a distance necessary for lane change of the subject vehicle. The seconds necessary for lane change are set in advance on the premise that a lateral movement distance and a speed in a lateral direction when the lane change is performed are constant values. The amount-of-steering-assistance determiner 154 sets a lane change end point in the lane that is the lane change destination on the basis of the derived distance necessary for lane change.

For example, on the basis of a current position of the subject vehicle and a reference direction V at a yaw angle, and a position of a set end point E of the lane change and the reference direction V at the yaw angle, the amount-of-steering-assistance determiner 154 generates a trajectory C for lane change by smoothly connecting such two points using a polynomial curve such as a spline curve. The amount-of-steering-assistance determiner 154, for example, generates a plurality of trajectory points D at predetermined intervals on the generated trajectory C. As feedforward control, the amount-of-steering-assistance determiner 154 determines the amount of steering assistance (steering torque) necessary for causing the subject vehicle to travel along the generated trajectory points D, for example, for each activation point D, on the basis of a relationship between an assumed speed and a turning angle θ, and outputs the amount of steering assistance to the steering actuator 64. Further, as feedback control, the amount-of-steering-assistance determiner 154 calculates the amount of steering assistance for reducing a deviation between the trajectory point and the position of the subject vehicle on the basis of the deviation and outputs the amount of steering assistance to the steering actuator 64.

[Electronic Parking Brake Control]

The electronic parking brake controller 170 performs control of holding a stopped state of the subject vehicle (electronic parking brake control) in response to an operation with respect to a switch (not illustrated) or in response to an instruction from the automatic stop controller 110.

The brake holding controller 172 instructs the brake actuator 62 to output a certain amount of braking such that the stopped state of the subject vehicle is maintained. The certain amount of braking is the amount of braking that allows the subject vehicle to maintain the stopped state even when there is a certain gradient on a road surface on which the subject vehicle is present. The overriding controller 174 releases the electronic parking brake control when an accelerator operation of the occupant of the subject vehicle is detected by the accelerator opening sensor 44. However, when the subject vehicle is stopped through the automatic stop control, the overriding controller 174 does not perform releases of the electronic parking brake control based on the accelerator operation.

[Cooperative Control]

Figure 10:
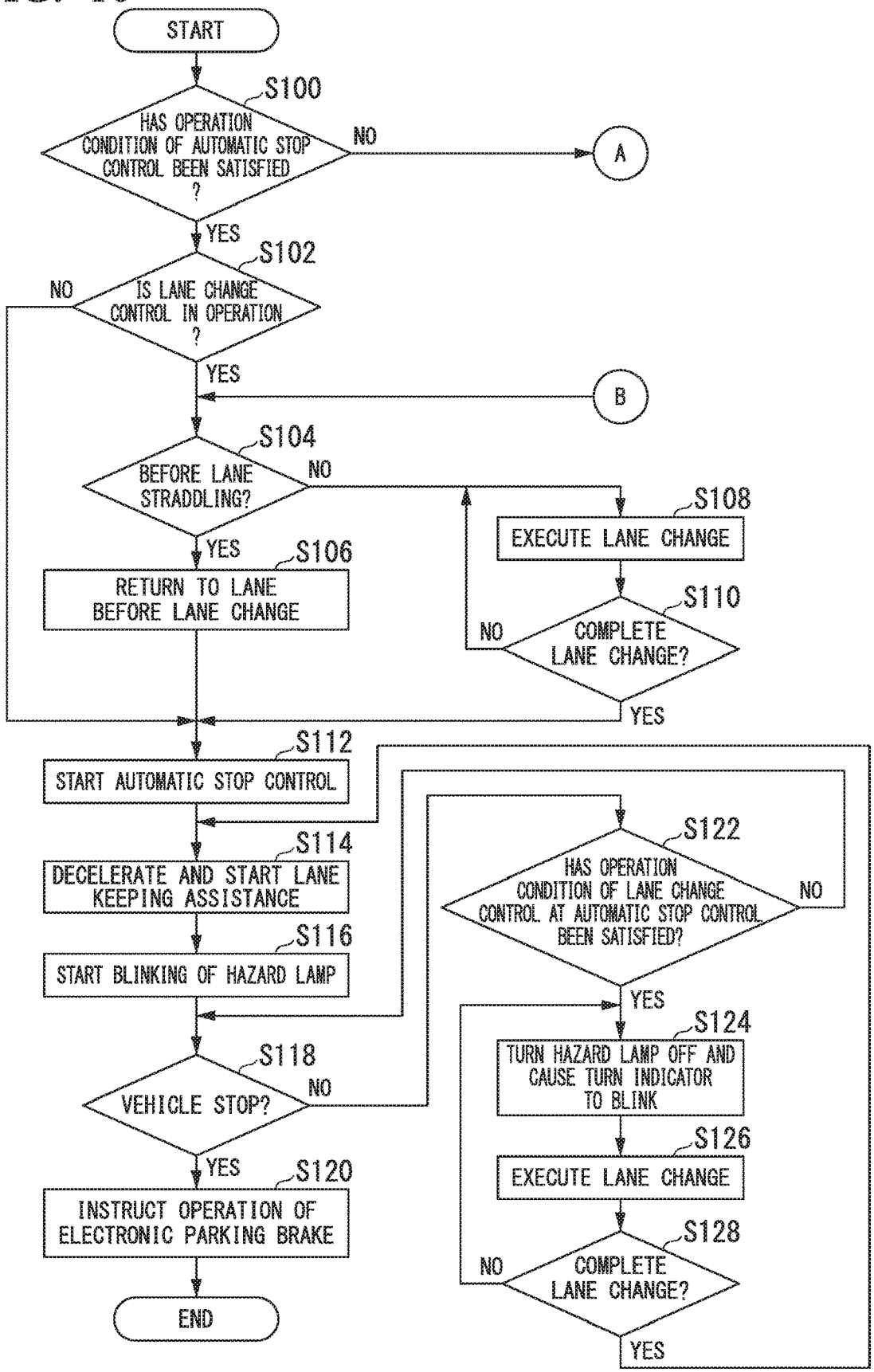
FIG. 10 is a flowchart (part 1) showing an example of a flow of a process taking each other's state into consideration to be executed by an automatic stop controller and a lane change controller.
Figure 14:
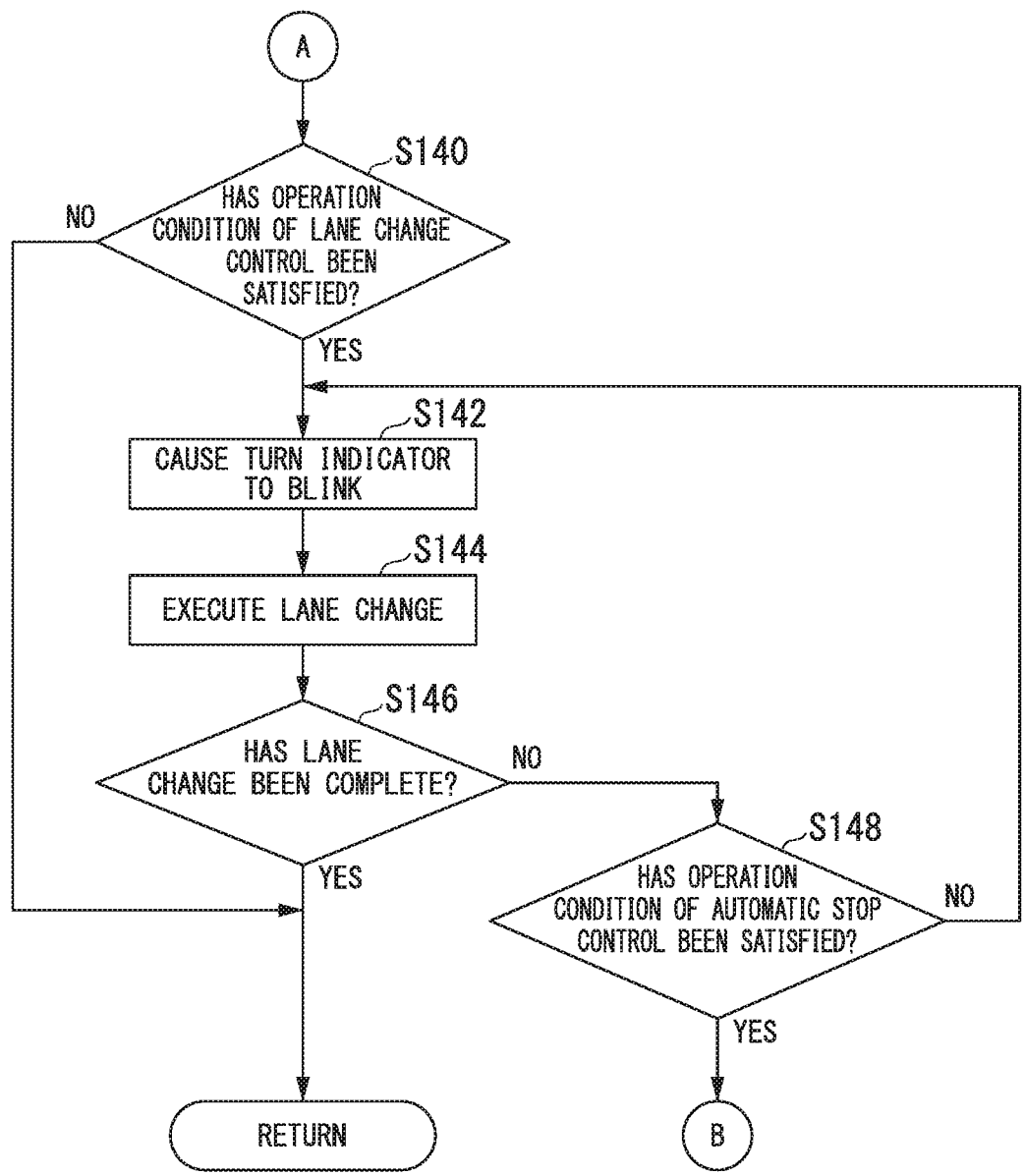
FIG. 14 is a flowchart (part 2) illustrating an example of a flow of a process to be executed by an automatic stop controller and a lane change controller in consideration of mutual states.
Figure 15:
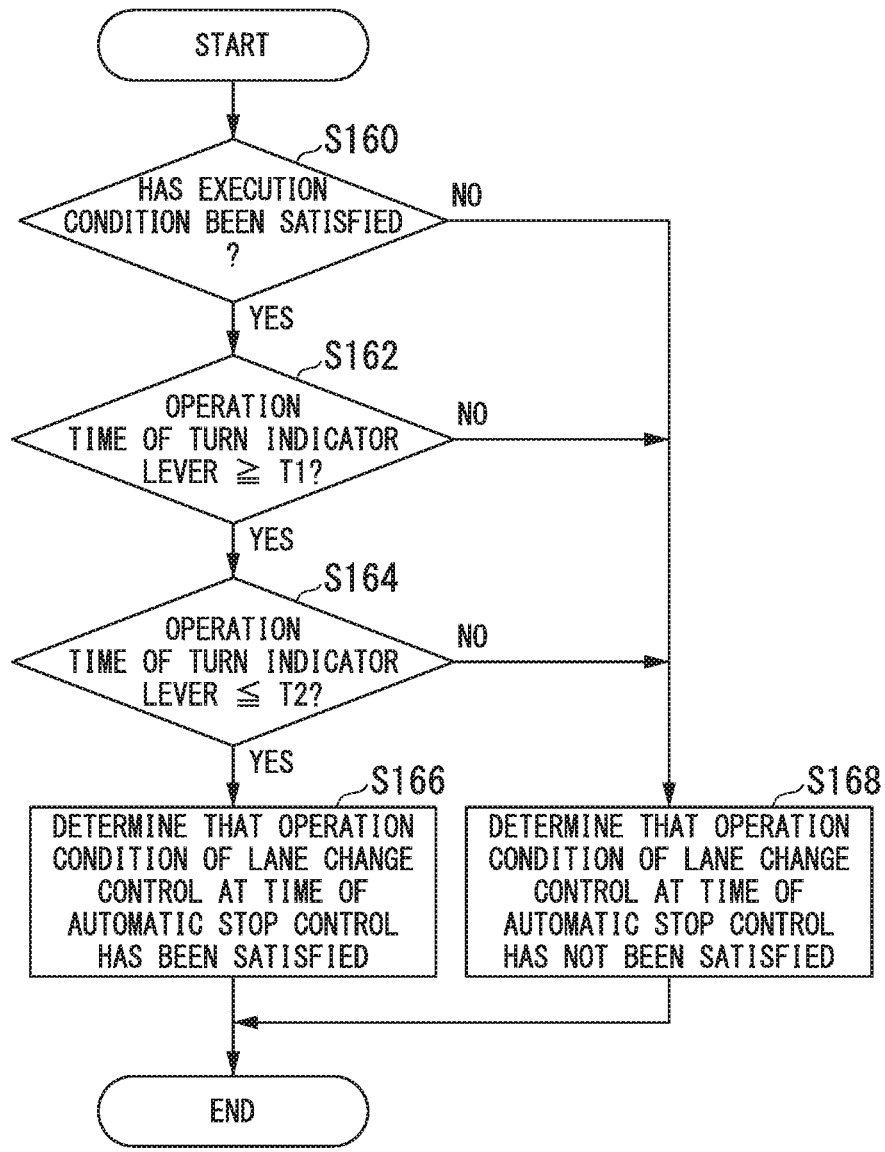
FIG. 15 is a flowchart (part 3) showing an example of a flow of a process taking each other's state into consideration to be executed by the automatic stop controller and the lane change controller.

Hereinafter, cooperative control of the automatic stop controller 110 and the lane change controller 150 will be described. FIGS. 10, 14, and 15 are flowcharts showing examples of flows of processes taking each other's state into consideration, which are executed by the automatic stop controller 110 and the lane change controller 150. The process of this flowchart is, for example, repeatedly executed at a predetermined period. In the following flowchart, a processing subject of each step may be the automatic stop controller 110, the lane change controller 150, or an arbitration unit higher in level than the automatic stop controller 110 and the lane change controller 150. However, the processing subjects are not distinguished herein and are simply described as a "vehicle control device 100".

First, the vehicle control device 100 determines whether or not the operation condition of the automatic stop control has been satisfied (step S100). The "operation condition has been satisfied" means, for example, that the operation condition has not been satisfied at a point in time at which a processing routine before a previous time has been executed, but the operation condition is satisfied at a point in time at which a current processing routine is executed. When the operation condition of the automatic stop control has been satisfied, the vehicle control device 100 determines whether or not the lane change control is in operation (step S102). "In operation" means "between a point in time at which the operation condition has been satisfied and completion of the operation".

Figure 11:
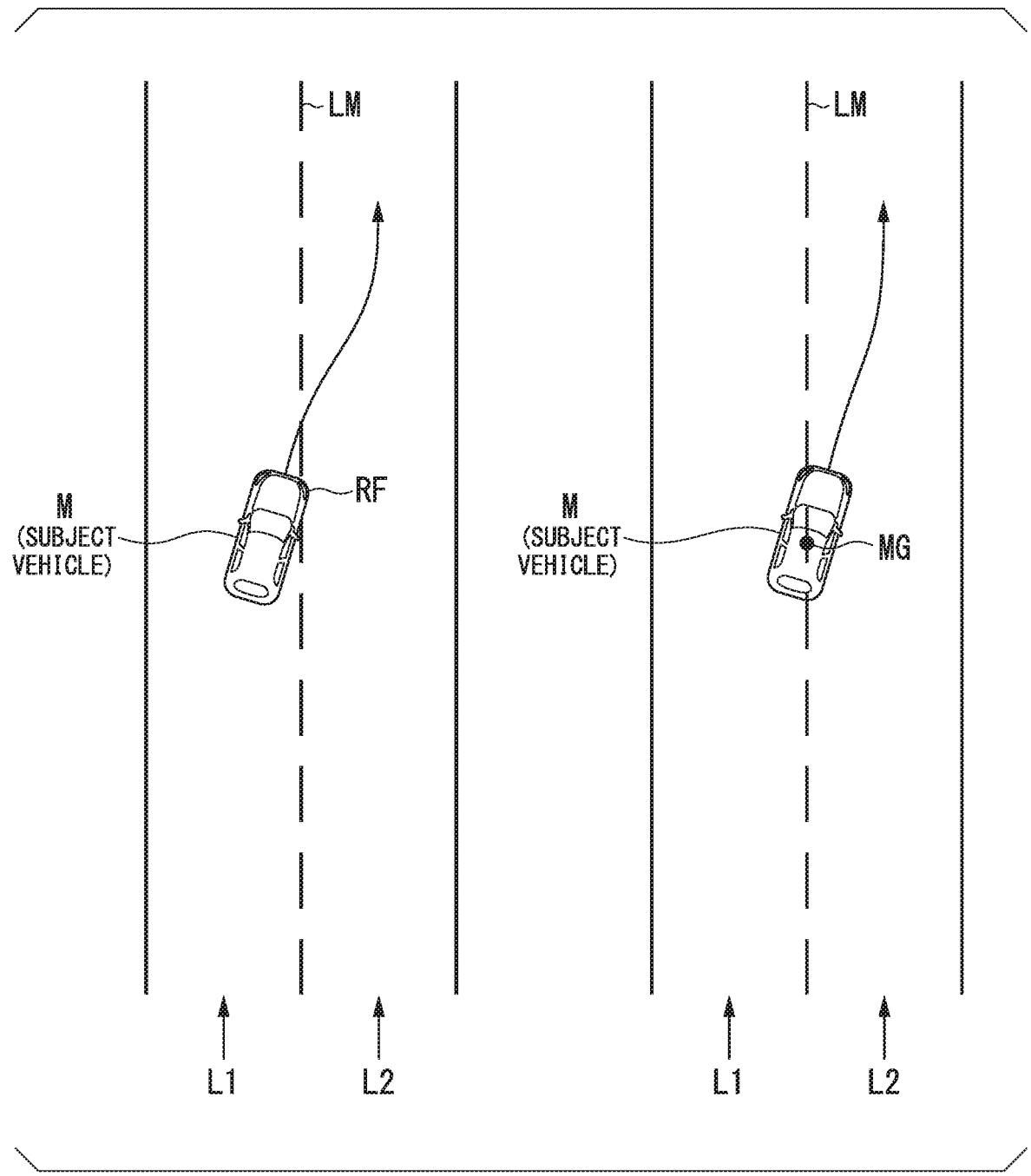
FIG. 11 is a diagram illustrating a definition of before lane straddling.
Figure 12:
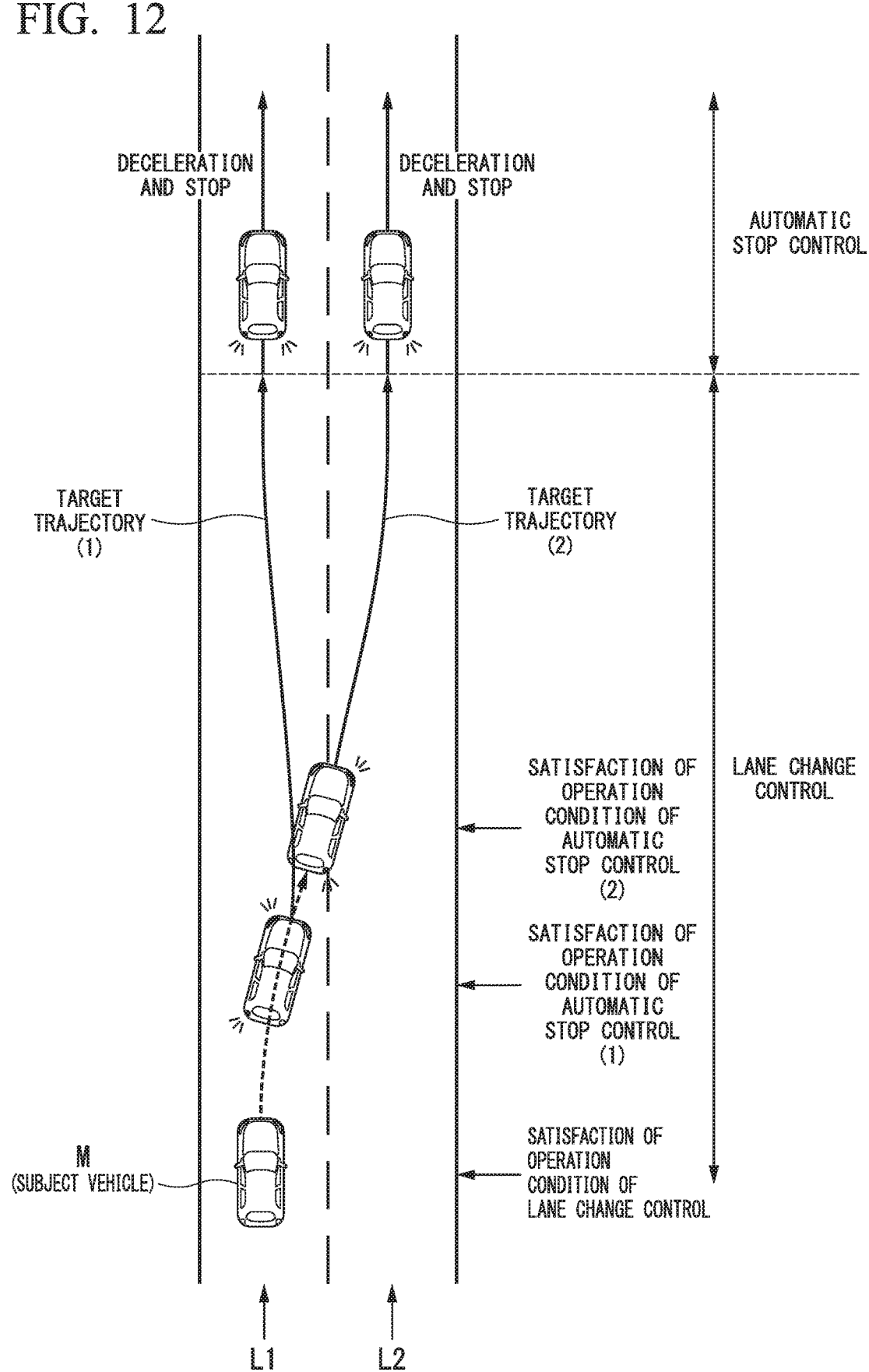
FIG. 12 is a diagram illustrating a state in which the vehicle control device determines whether a subject vehicle returns to a lane that is a lane change source or lane change continues.

When the lane change control is in operation, the vehicle control device 100 determines whether or not the subject vehicle is before lane straddling (step S104). "Before lane straddling" means that a position in the lateral direction of the subject vehicle is a position at which the subject vehicle does not advance to a certain degree or more with respect to the lane marking line that the subject vehicle straddles due to the lane change. FIG. 11 is a diagram illustrating a definition of "before lane straddling". In FIGS. 11 and 12, L1 indicates a lane that is a lane change source, and L2 indicates a lane that is a lane change destination. Each state illustrated in FIG. 11 is an example of a state in which the subject vehicle is not before lane straddling. The state in which the subject vehicle is not before lane straddling may be defined as a front end RF of the subject vehicle completely straddling the lane marking line LM as illustrated in a left diagram of FIG. 11 or may be defined as a centroid MG of the subject vehicle at least overlapping the lane marking line LM, as illustrated in a right diagram of FIG. 11.

When the subject vehicle is before lane straddling, the vehicle control device 100 controls the steering actuator 64 to cause the subject vehicle to return to the lane that is a lane change source (step S106). More specifically, the vehicle control device 100 controls so that the subject vehicle travels on a lane center line of the lane that is a lane change source. On the other hand, when the subject vehicle is not before lane straddling, the vehicle control device 100 controls the steering actuator 64 to execute the lane change until the lane change is completed (steps S108 and S110).

Thus, when the operation condition of the automatic stop control has been satisfied while the lane change control is in operation, the vehicle control device 100 determines whether to cause the subject vehicle to return to a lane that is a lane change source or to continue the lane change on the basis of a position of the subject vehicle with respect to the lane marking line at an establishment point in time. FIG. 12 is a diagram illustrating a state in which the vehicle control device 100 determines whether to cause the subject vehicle to return to a lane that is a lane change source or to continue the lane change. In FIG. 12, when the operation condition of the automatic stop control is satisfied at a position indicated as "satisfaction of operation condition of automatic stop control (1)", the subject vehicle travels along a target trajectory (1) and returns to the lane that is the lane change source. On the other hand, when the operation condition of the automatic stop control is satisfied at a position indicated as "satisfaction of operation condition of automatic stop control (2)", the subject vehicle travels along a target trajectory (2) and completes the lane change. By making such a determination, it is possible to reduce a movement in a lateral direction of the vehicle until the vehicle returns to the lane that is a lane change source or completes the lane change and reduce an influence on all traffic.

Blinking of the hazard lamp 70 with the automatic stop control is not performed and the turn indicator 54 is blinking until the subject vehicle returns to the lane change source or until the lane change is completed. Accordingly, it is possible to avoid occurrence of a situation in which occupants of other vehicle traveling near the subject vehicle are confused due to the behavior of the subject vehicle and the blinking of the hazard lamp 70 being not linked to each other.

When the subject vehicle has returned to a lane before the lane change or when the lane change is completed, the vehicle control device 100 starts automatic stop control (step S112). The vehicle control device 100 starts assistance for keeping the lane while decelerating the subject vehicle starts (step S114) and starts blinking of the hazard lamp 70 (step S116).

Next, the vehicle control device 100 determines whether or not the subject vehicle is stopped (step S118). When it is determined that the subject vehicle is stopped, the vehicle control device 100 instructs the electronic parking brake controller 170 to hold the stopped state of the subject vehicle (step S120).

When it is determined that the subject vehicle is not stopped, the vehicle control device 100 determines whether or not the operation condition of the lane change control at the time of the automatic stop control has been satisfied (step S122). The operation condition of the lane change control at the time of the automatic stop control will be described below. When the operation condition of the lane change control at the time of the automatic stop control is not satisfied, the process returns to step S118.

When the operation condition of the lane change control at the time of automatic stop control has been satisfied, the vehicle control device 100 turns the hazard lamp 70 off and causes the turn indicator 54 to blink (step S124). In this state, the vehicle control device 100 executes the lane change until the lane change is completed (steps S126 and S128). When the lane change is completed, the process returns to step S114 and the automatic stop control is restarted.

Figure 13:
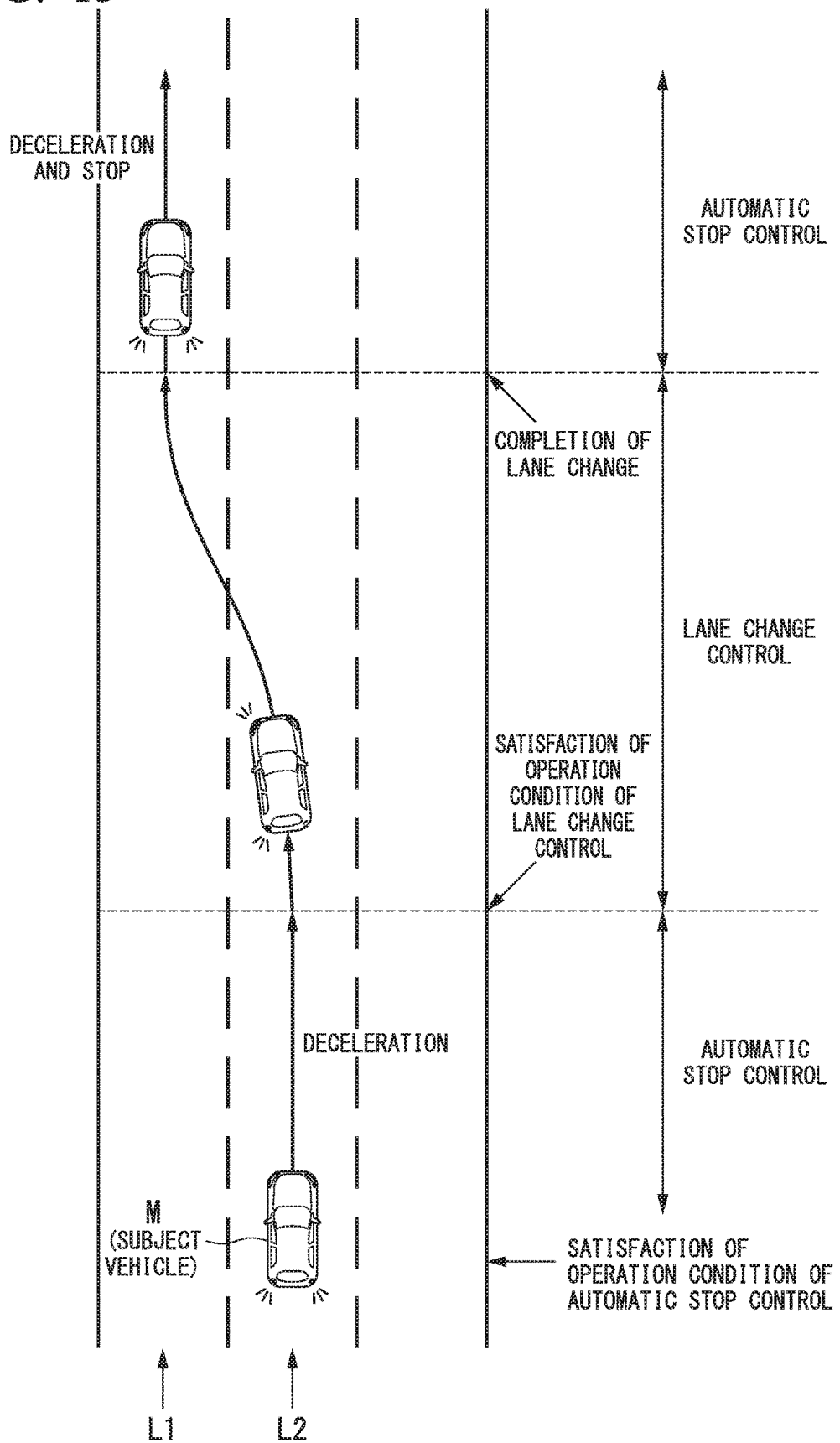
FIG. 13 is a diagram illustrating a scene in which lane change control is executed by interruption at the time of automatic stop control.

FIG. 13 is a diagram illustrating a scene in which the lane change control is executed by interruption at the time of automatic stop control. As illustrated in FIG. 13, the subject vehicle performs deceleration in a state in which the hazard lamp 70 is blinking in initial automatic stop control, turns the hazard lamp 70 off when the operation condition of the lane change control is satisfied, performs the lane change while causing the turn indicator 54 to blink, resumes the automatic stop control when the lane change is completed, decelerates while causing the hazard lamp 70 to blink, and stops. Such a scene occurs, for example, in the following situation. First, the occupant of the subject vehicle performed an operation to start the automatic stop control since the occupant of the subject vehicle felt bad. However, since the lane on which the subject vehicle was traveling was an overtaking lane or the like, the turn indicator lever 52 was operated to move to a lane near a shoulder of the road. As a result, the subject vehicle changed the lane to a lane closer to the shoulder of the road, completed the lane change, decelerated, and stopped. Thus, it is possible to cause the subject vehicle to progress toward the lane on which the subject vehicle should originally progress by enabling the lane change control to be executed by interruption even after the automatic stop control is started.

When it is determined in step S100 of FIG. 10 that the operation condition of the automatic stop control is not satisfied, the process illustrated in FIG. 14 is performed. The vehicle control device 100 determines whether or not the operation condition of the lane change control has been satisfied (step S140). When the operation condition of the lane change control is not satisfied, one routine of a process of a flowchart to be repeatedly performed ends (returns to step S100).

When the operation condition of the lane change control is satisfied, the vehicle control device 100 causes the turn indicator 54 to blink on the lane change side (step S142) and executes the lane change (step S144). It is determined whether or not the lane change is completed (step S146). When the lane change is completed, one routine of the process of the flowchart to be repeatedly executed ends (returns to step S100).

When the lane change is not completed, the vehicle control device 100 determines whether or not the operation condition of the automatic stop control has been satisfied (step S148). When the operation condition of the automatic stop control has not been satisfied, the process returns to step S142. When the operation condition of the automatic stop control has been satisfied, the process returns to step S104 of FIG. 10.

FIG. 15 is a flowchart showing the content of a determination process of step S122 in the flowchart of FIG. 10 in more detail. First, the vehicle control device 100 determines whether or not execution condition for the lane change control is satisfied (step S160). When the execution condition of the lane change control is not satisfied, the vehicle control device 100 determines that the operation condition of the lane change control at the time of the automatic stop control is not satisfied (step S168).

When the execution condition of the lane change control is satisfied, the vehicle control device 100 determines whether or not the turn indicator lever 52 is operated and an operation time is equal to or more than the first predetermined time T1 (step S162). When the turn indicator lever 52 is not operated or the operation time of the turn indicator lever 52 is less than the first predetermined time T1, the vehicle control device 100 determines that the operation condition of the lane change control at the time of the automatic stop control is not satisfied (step S168).

When the turn indicator lever 52 is operated and the operation time is equal to or more than the first predetermined time T1, the vehicle control device 100 determines whether or not the operation time of the turn indicator lever 52 is equal to or less than a second predetermined time T2 (step S164). The first predetermined time T1<the second predetermined time T2. When the operation time of the turn indicator lever 52 exceeds the second predetermined time T2, the vehicle control device 100 determines that the operation condition of the lane change control at the time of the automatic stop control is not satisfied (step S168). Accordingly, for example, it is possible to prevent unnecessary lane change from being performed when the occupant of the subject vehicle operates the deceleration control and then falls down to the turn indicator lever 52.

When the operation time of the turn indicator lever 52 is equal to or less than the second predetermined time T2, the vehicle control device 100 determines that the operation condition of the lane change control at the time of the automatic stop control has been satisfied (step S166).

In the above description, it is assumed that the lane change controller 150 performs lane change according to the operation of the occupant. The present invention is not limited thereto, and the lane change controller 150 may automatically perform the lane change for the purpose of branching, right and left turning, overtaking, or the like when executing automatic driving. Even in this case, a relationship with the automatic stop controller 110 described above may be maintained.

Figure 16:
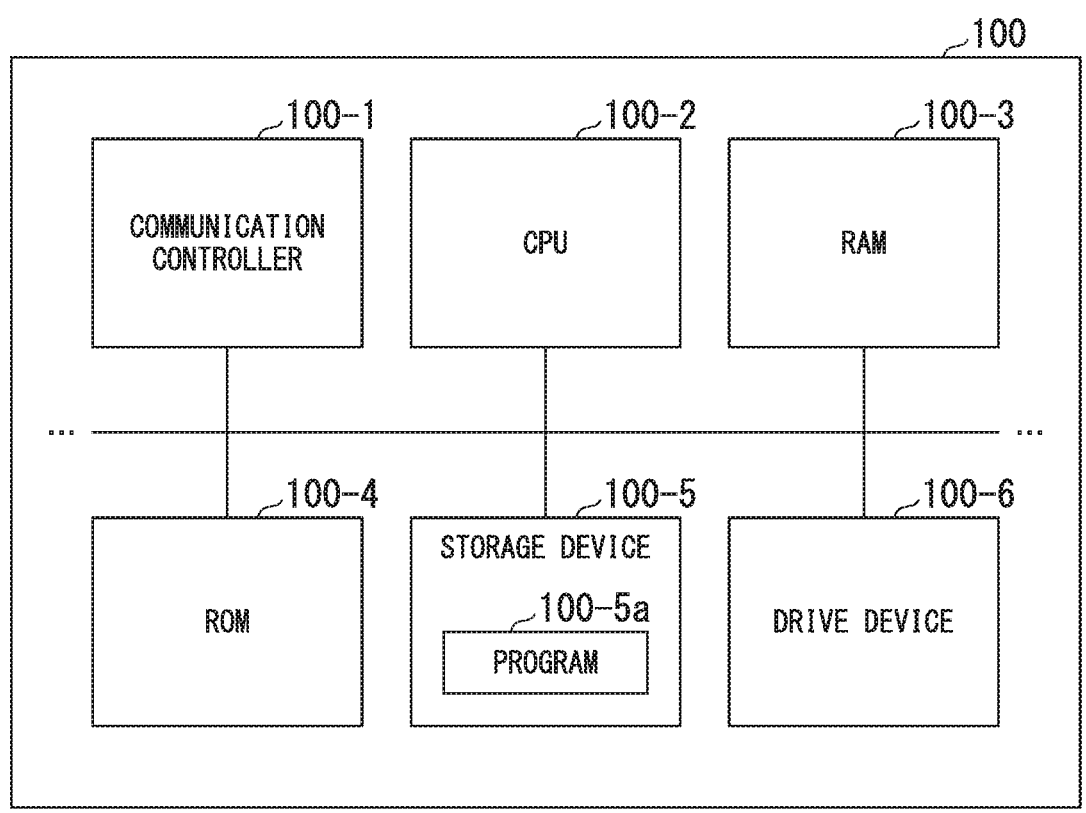
FIG. 16 is a diagram illustrating an example of a hardware configuration of the vehicle control device.

FIG. 16 is a diagram illustrating an example of a hardware configuration of the vehicle control device 100. As illustrated in FIG. 16, the vehicle control device 100 includes a communication controller 100-1, a CPU 100-2, a random access memory (RAM) 100-3 to be used as a working memory, a read only memory (ROM) 100-4 that stores a boot program or the like, a storage device 100-5 such as a flash memory and a hard disk drive (HDD), and a drive device 100-6, which are connected to each other by an internal bus or a dedicated communication line. The communication controller 100-1 performs communication with components other than the vehicle control device 100 illustrated in FIG. 1. A program 100-5a to be executed by the CPU 100-2 is stored in the storage device 100-5. This program is developed in the RAM 100-3 by a direct memory access (DMA) controller (not illustrated) or the like and executed by the CPU 100-2. Accordingly, some or all of the automatic stop controller 110, the lane change controller 150, and the electronic parking brake controller 170 are realized.

According to the vehicle control device 100 described above, the vehicle control device (100) includes the automatic stop controller (110) that operates according to an operation of an occupant of a vehicle or on the basis of a result of detecting a state of the occupant, and performs at least control of decelerating and stopping the vehicle, and the lane change controller (150) that causes the vehicle to change a lane independently of a steering operation of the occupant of the vehicle, and at least a part of the control of the automatic stop controller 110 is restricted when the operation condition of the automatic stop controller 110 and the operation condition of the lane change controller 150 are satisfied at the same time, such that the subject vehicle can be caused to progress toward the lane on which the subject vehicle has to originally progress.

The above-described embodiment can be represented as follows.

A vehicle control device comprising:
a hardware processor, and
a storage device,
wherein a program is stored in the storage device, the program causing the hardware processor to execute
first control of operating according to an operation of an occupant of a vehicle or on the basis of a result of detecting a state of the occupant, and performing at least decelerating and stopping the vehicle, and
second control of causing the vehicle to change a lane independently of a steering operation of the occupant of the vehicle, and
wherein at least a part of the first control is restricted when an operation condition of the first control and an operation condition of the second control are satisfied at the same time.

Although the modes for carrying out the present invention have been described above using the embodiments, the present invention is not limited to the embodiments at all, and various modifications and substitutions may be made without departing from the spirit of the present invention.

What is claimed is:

1. A vehicle control device, comprising:
a deceleration controller that performs at least control of decelerating a vehicle in response to operation of a switch that is different from a brake pedal or in response to determining that an occupant of the vehicle is in a state of having difficulty in continuing driving; and
a lane change controller that causes the vehicle to change a lane independently of a steering operation of the occupant of the vehicle,
wherein
at least a part of control of the deceleration controller is restricted in response to determining that an operation condition of the deceleration controller and an operation condition of the lane change controller are satisfied at a same time,
the deceleration controller controls a hazard lamp attached to a rear portion of the vehicle so that the hazard lamp blinks when the deceleration controller decelerates the vehicle, and
when the operation condition of the deceleration controller and the operation condition of the lane change controller are satisfied at the same time, at least blinking control of the hazard lamp is restricted.

2. The vehicle control device according to claim 1,
wherein, the deceleration controller decelerates and stops the vehicle in response to an operation performed by the occupant of a vehicle or based on a result of detecting a state of the occupant.

3. The vehicle control device according to claim 1,
wherein control of the deceleration controller is performed after the vehicle completes a lane change according to the lane change controller when the operation condition of the deceleration controller is satisfied earlier than the operation condition of the lane change controller and then the control of the deceleration controller is not completed at a time that the operation condition of the deceleration controller is satisfied.

4. The vehicle control device according to claim 1,
wherein, when the operation condition of the lane change controller is satisfied earlier than the operation condition of the deceleration controller, the lane change controller determines whether the lane change is to continue or the vehicle is to return to a former lane based on a position of the vehicle with respect to a lane marking line at a point in time at which the operation condition of the deceleration controller has been satisfied and then the control of the deceleration controller is not completed at the point in time at which the operation condition of the deceleration controller is satisfied.

5. The vehicle control device according to claim 1,
wherein, when the operation condition of the deceleration controller is satisfied and an operation with respect to a detection unit that detects a lane change intention of the occupant of the vehicle continues for at least a predetermined duration of time, the lane change controller does not cause the vehicle to change the lane.

6. A vehicle control device, comprising:
a deceleration controller that performs at least control of decelerating a vehicle, in response to operation of a switch that is different from a brake pedal or in response to determining that the occupant is in a state of having difficulty in continuing driving; and
a lane change controller that causes the vehicle to change a lane independently of a steering operation of the occupant of the vehicle,
wherein when an operation condition of the lane change controller is satisfied earlier than an operation condition of the deceleration controller and then the control of the deceleration controller is not completed when the operation condition of the deceleration controller is satisfied, the lane change controller determines whether the lane change will continue or return to a former lane based on a position with respect to a lane marking line of the vehicle at a point in time at which the operation condition of the deceleration controller is satisfied.

7. A vehicle control method implemented by a computer mounted on a vehicle, the vehicle control method comprising:
performing deceleration control of decelerating a vehicle, in response to operation of a switch that is different from a brake pedal or in response to determining that an occupant of the vehicle is in a state of having a difficulty in continuing driving; and
performing lane change control of causing the vehicle to change a lane independently of a steering operation of the occupant of the vehicle,
wherein
at least a part of the deceleration control is restricted when an operation condition of the deceleration control and an operation condition of the lane change control are satisfied at a same time,
the deceleration controller controls a hazard lamp so that the hazard lamp blinks when the deceleration controller decelerates the vehicle, and
when the operation condition of the deceleration controller and the operation condition of the lane change controller are satisfied at the same time, at least blinking control of the hazard lamp of the deceleration controller is restricted.

8. A computer readable non-transitory storage medium having a program stored therein, the program causing a computer to:

perform deceleration control of decelerating a vehicle, in response to operation of a switch that is different from a brake pedal or in response to a determination that an occupant of the vehicle is in a state of having a difficulty in continuing driving; and
perform lane change control of causing the vehicle to change a lane independently of a steering operation of the occupant of the vehicle,
wherein
at least a part of the deceleration control is restricted when an operation condition of the deceleration control and an operation condition of the lane change control are satisfied at a same time,
the deceleration controller controls a hazard lamp so that the hazard lamp blinks when the deceleration controller decelerates the vehicle, and
when the operation condition of the deceleration controller and the operation condition of the lane change controller are satisfied at the same time, at least blinking control of the hazard lamp of the deceleration controller is restricted.

9. A vehicle control method that is executed by a computer mounted on a vehicle, the vehicle control method comprising:
performing deceleration control of decelerating a vehicle, in response to operation of a switch that is different from a brake pedal or in response to determining that the occupant is in a state of having a difficulty in continuing driving;
performing lane change control of causing the vehicle to change a lane independently of a steering operation of the occupant of the vehicle; and
determining whether the lane change continues or return to a former lane based on a position with respect to a lane marking line of the vehicle at a point in time at which an operation condition of the deceleration control is satisfied, when an operation condition of the lane change control is satisfied earlier than the operation condition of the deceleration control and then control of the deceleration controller is not completed at the point in time at which the operation condition of the deceleration controller is satisfied.

10. A computer readable non-transitory storage medium having a program stored therein, the program causing a computer to:
perform deceleration control of decelerating a vehicle, in response to operation of a switch that is different from a brake pedal is or in response to determining that an occupant of the vehicle is in a state of having a difficulty in continuing driving;
perform lane change control of causing the vehicle to change a lane independently of a steering operation of the occupant of the vehicle; and
determine whether the lane change continues or return to a former lane based on a position of the vehicle with respect to a lane marking line at a time at which an operation condition of the deceleration control is satisfied, when an operation condition of the lane change control is satisfied earlier than the operation condition of the deceleration control and then control of the deceleration controller is not completed at the time at which the operation condition of the deceleration controller is satisfied.

* * * * *